United States Patent
He et al.

(10) Patent No.: US 10,714,738 B2
(45) Date of Patent: Jul. 14, 2020

(54) MANUFACTURING METHOD FOR SELENIUM PRELOADED MESOPOROUS CARBON CATHODE FOR ALKALI METAL-SELENIUM SECONDARY BATTERY

(71) Applicant: Nanotek Instruments, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 114 days.

(21) Appl. No.: 15/956,325

(22) Filed: Apr. 18, 2018

(65) Prior Publication Data
US 2019/0326588 A1   Oct. 24, 2019

(51) Int. Cl.
| | |
|---|---|
| H01M 10/28 | (2006.01) |
| H01M 4/1395 | (2010.01) |
| H01M 4/139 | (2010.01) |
| H01M 4/134 | (2010.01) |
| H01M 4/583 | (2010.01) |

(52) U.S. Cl.
CPC ......... *H01M 4/134* (2013.01); *H01M 4/1395* (2013.01); *H01M 4/583* (2013.01); *H01M 10/28* (2013.01)

(58) Field of Classification Search
None
See application file for complete search history.

(56) References Cited

PUBLICATIONS

An et al., "Diameter-Selected Synthesis of Single Crystalline Trigonal Selenium Nanowires" Materials Chemistry and Physics (2007) vol. 101, No. 2-3, pp. 357-361.
An et al., "Large-Scale Synthesis of High Quality Trigonal Selenium Nanowires" European Journal of Inorganic Chemistry (2003) vol. 17, pp. 3250-3255.
Chen et al., "Selenium nanowires and nanotubes synthesized via a facile template-free solution method" Materials Research Bulletin (2010) vol. 45, pp. 699-704.
Dwivedi et al., "An Organic Acid-induced Synthesis and Characterization of Selenium Nanoparticles" Journal of Nanotechnology (2011) Article ID 651971, 6 pages.

(Continued)

*Primary Examiner* — Yoshitoshi Takeuchi

(57) ABSTRACT

A method of producing a pre-selenized (selenium-preloaded) active cathode layer for a rechargeable alkali metal-selenium cell; the method comprising: (a) preparing an integral layer of mesoporous structure having pore sizes from 0.5 nm to 50 nm (preferably from 0.5 nm to 5 nm) and a specific surface area from 100 to 3,200 $m^2/g$; (b) preparing an electrolyte comprising a solvent and a selenium source; (c) preparing an anode; and (d) bringing the integral layer and the anode in ionic contact with the electrolyte and imposing an electric current between the anode and the integral layer (serving as a cathode) to electrochemically deposit nanoscaled selenium particles or coating on the graphene surfaces. The selenium particles or coating have a thickness or diameter smaller than 20 nm (preferably <10 nm, more preferably <5 nm or even <3 nm) and preferably occupy a weight fraction of at least 70% (preferably >90% or even >95%).

20 Claims, 7 Drawing Sheets

(56) References Cited

PUBLICATIONS

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

MANUFACTURING METHOD FOR SELENIUM PRELOADED MESOPOROUS CARBON CATHODE FOR ALKALI METAL-SELENIUM SECONDARY BATTERY

FIELD OF THE INVENTION

The present invention provides a unique cathode composition and structure in a secondary or rechargeable alkali metal-selenium battery, including the lithium-selenium battery and sodium-selenium battery, and a process for producing same.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range of 140-180 mAh/g. As a result, the specific energy of commercially available Li-ion cells is typically in the range of 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity, Se is a more effective cathode active material and, as such, Li—Se potentially can exhibit a higher rate capability.

However, Li—Se cell is plagued with several major technical problems that have hindered its widespread commercialization:

(1) All prior art Li—Se cells have dendrite formation and related internal shorting issues;
(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.
(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into these mesoscaled pores using a physical vapor deposition or solution precipitation process. Typically the maximum loading of Se in these porous carbon structures is less than 50%.

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electroactive cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during charge/discharge.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/Kg, preferably greater than 350 Wh/Kg, and more preferably greater than 400 Wh/Kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium cell based on rational materials and battery designs that overcome or significantly reduce the following issues commonly associated with conventional Li—Se cells: (a) dendrite formation (internal shorting); (b) low electric and ionic conductivities of selenium, requiring large proportion (typically 30-55%) of non-active conductive fillers and having significant proportion of non-accessible or non-reachable selenium or lithium polyselenide); (c) dissolution of lithium polyselenide in electrolyte and migration of dissolved lithium polyselenide from the cathode to the anode (which irreversibly react with lithium at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential Li metal dendrite-induced internal short circuit and thermal runaway problems in Li metal-selenide batteries.

SUMMARY OF THE INVENTION

The present invention provides a unique cathode composition and structure in a secondary or rechargeable alkali metal-selenium battery, including the lithium-selenium battery, sodium-selenium battery, and potassium-selenium battery. The lithium-selenium battery can include the lithium metal-selenium battery (having lithium metal as the anode active material and selenium as the cathode active material) and the lithium ion-selenium battery (e.g. Si or graphite as the anode active material and selenium as the cathode active material). The sodium-selenium battery can include the sodium metal-selenium battery (having sodium metal as the anode active material and selenium as the cathode active material) and the sodium ion-selenium battery (e.g. hard carbon as the anode active material and selenium as the cathode active material).

The present invention provides an electrochemical method of producing a pre-selenized active cathode layer for use in a rechargeable alkali metal-selenium cell. The term "pre-selenized" means pre-loading selenium into a cathode active material before this cathode active material is incorporated into a battery cell (if this pre-selenization procedure is conducted outside of the intended lithium-selenium cell) or before the battery cell is operated to provide power to an external device (if this pre-selenization procedure is conducted in situ inside the intended lithium-selenium cell during the first charge cycle).

Such an electrochemical method is surprisingly capable of uniformly depositing an ultra-thin selenium (Se) coating layer or ultra-small small Se particles (<20 nm, more preferably and typically <10 nm, most typically and preferably <5 nm, or even <3 nm) on massive pore wall surfaces or inside the pores of a mesoporous structure, yet achieving a large proportion of Se (the cathode active material) relative to the supporting mesoporous structure. These electrochemically deposited Se coating or particles remain well-adhered to the pore wall surfaces or lodged in the mesoscaled pores during repeated charges/discharges, enabling an unusually high long cycle life. The ultra-thin dimensions also enable high storing/releasing rates of alkali metal ions ($Li^+$, $Na^+$, and/or $K^+$) and, hence, exceptional rate capability or power density.

For the purpose of describing the preferred embodiments of the instant invention, Li ions, Li metal, and Li—Se cells are used as examples. But, the same or similar procedures are applicable to other alkali metals and alkali metal-selenium cells (e.g. Na—Se cells and K—Se cells) This method comprises the following four elements, (a)-(d):

a) Preparing an integral layer of mesoporous graphene structure having mesoscaled pores (0.5-50 nm in size) and massive surfaces with a specific surface area greater than 100 $m^2/g$. The porous structure has a specific surface area preferably >500 $m^2/g$ and more preferably >750 $m^2/g$, and most preferably >1,000 $m^2/g$.

The integral layer of a mesoporous structure comprises primarily a carbon, graphite, metal, or conductive polymer selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.4 nm, chemically expanded carbon nanofiber, chemically activated carbon nanotube, chemically treated carbon fiber, chemically activated graphite fiber, chemically activated carbonized polymer fiber, chemically treated coke, activated mesophase carbon, mesoporous carbon, electrospun conductive nanofiber, highly separated vapor-grown carbon or graphite nanofibers (to ensure a specific surface area >100 $m^2/g$ even after these fibers are packed together), carbon or graphite whisker, carbon nanotube, carbon nanowire, metal nanowire, metal-coated nanowire or nanofiber, conductive polymer-coated nanowire or nanofiber, or a combination thereof.

It may be noted that these carbon/graphite materials, without any chemical etching/expansion treatment, typically contain some graphitic crystals or graphene domains therein having a spacing between two hexagonal carbon planes or inter-graphene spacing from 0.335 nm to 0.37 nm. These materials may be subjected to chemical etching, intercalation, oxidation, fluorination, etc. to expand the spacing from <0.37 nm to become greater than 0.5 nm, preferably greater than 0.6 nm, further preferably greater than 1.0 nm, and most desirably from 0.5 nm to 5 nm. Such treatments open up the internal graphitic structure, enabling entry of liquid electrolyte into the pores and making it possible for selenium or metal selenide species to reside in these pores or get adhered to the pore walls during the subsequent electrochemical deposition (described below in steps (b)-(d)).

These materials, in a particulate or fibrous form, along with an optional binder material (0-10% by weight), are combined to form a mesoporous structure that must still have a specific surface area greater than 100 m²/g (preferably >500 m²/g and more preferably >750 m²/g, and most preferably >1,000 m²/g).

The layer of mesoporous graphene structure may optionally contain 0-49% (preferably 0-30%, more preferably 0-20%, and further preferably 0-10%) by weight of selenium or selenium-containing compound pre-loaded therein prior to the current electrochemical deposition), based on the total weights of all ingredients in the layer. Although not preferred, one can pre-load 0.01% to 49% of Se in the mesoporous structure.

b) Preparing an electrolyte comprising a solvent (preferably non-aqueous solvent such as organic solvent and/or ionic liquid) and a selenium source dissolved or dispersed in the solvent;

c) Preparing an anode (this anode layer can be an anode active material layer in an intended alkali metal-selenium cell or an electrode in an external chamber/reactor that is external or unrelated to the intended alkali metal-selenium cell); and d) Bringing the integral layer of mesoporous structure and the anode in ionic contact with the electrolyte (e.g. immersing all these components in a chamber or reactor being external to the intended alkali metal-selenium cell, or encasing these three components inside the battery cell) and imposing an electric current between the anode and the integral layer of mesoporous structure (serving as a cathode) with a sufficient current density for a sufficient period of time to electrochemically deposit nanoscaled particles or coating of selenium or metal selenide (e.g. $Li_2Se_x$, $2<x<10$) in the mesoscaled pores to form the pre-selenized active cathode layer, wherein the particles or coating have a thickness or diameter smaller than 20 nm (preferably <10 nm, more preferably <5 nm, and further preferably <3 nm) and wherein the nanoscaled selenium or metal selenide particles or coating occupy a weight fraction of preferably at least 70% (more preferably >80%, even more preferably >90%, and most preferably >95%) based on the total weights of the selenium or metal selenide particles or coating and the mesoporous structure combined.

When these three components (the mesoporous structure, anode, and electrolyte) are encased inside the intended alkali metal-selenium cell, nanoselenium or metal selenide is electrochemically deposited in situ in the cathode inside the battery cell. When the three components are implemented in an external container (chamber or reactor outside of the intended battery cell), nanoselenium or metal selenide is deposited in the mesoscaled pores through the "external electrochemical deposition" route.

In one preferred embodiment, the selenium source is selected from $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xSe_y$ is selected from $Li_2Se_6$, $Li_2Se_7$, $Li_2Se_8$, $Li_2Se_9$, $Li_2Se_{10}$, $Na_2Se_6$, $Na_2Se_7$, $Na_2Se_8$, $Na_2Se_9$, $Na_2Se_{10}$, $K_2Se_6$, $K_2Se_7$, $K_2Se_8$, $K_2Se_9$, $K_2Se_{10}$, or a combination thereof.

In one embodiment, the anode comprises an anode active material selected from an alkali metal, an alkaline metal, a transition metal, a metal from groups 13 to 17 of the periodic table, or a combination thereof.

In one embodiment, the method further comprises a procedure of depositing an element Z to the mesoporous structure wherein element Z is mixed with selenium or formed as discrete Z coating or particles having a dimension less than 100 nm (preferably <20 nm, further preferably <10 nm, even more preferably <5 nm, and most preferably <3 nm) and Z element is selected from Sn, Sb, Bi, S, and/or Te. The procedure of depositing element Z may be preferably selected from electrochemical deposition, chemical deposition, or solution deposition. We have discovered that the addition of some amount (less than 50%, preferably less than 20% by weight) of Sn, Sb, Bi, S, or Te can lead to improved cathode conductivity and/or higher specific capacity.

The electrolyte may further comprise a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethysulfonylimide (LiBETI), lithium bis(trifluoromethanesulfonyl)imide, lithium bis(fluorosulfonyl)imide, lithium trifluoromethanesulfonimide (LiTFSI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

In one preferred embodiment, the electrochemical deposition is conducted before the cathode active layer is incorporated into an intended lithium-selenium (Li—Se) battery cell, Na—Se cell, or K—Se cell. In other words, the anode, the electrolyte, and the integral layer of mesoporous structure (serving as a cathode layer) are disposed in an external container outside of a lithium-selenium cell. The needed apparatus is similar to an electroplating system. The step of electrochemically depositing nanoscaled selenium particles or coating in the mesoscaled pores is conducted outside the lithium-selenium cell and prior to the battery cell fabrication.

In another embodiment, the anode, the electrolyte, and the integral layer of porous graphene structure are included inside an alkali metal-selenium cell (e.g. a lithium-selenium cell). In other words, the battery cell itself is an electrochemical deposition system for pre-selenization of the cathode and the step of electrochemically depositing nanoscaled selenium particles or coating in the mesoscaled pores occurs after the lithium-selenium cell is fabricated. This electrochemical deposition procedure is conducted during the first charge cycle of the Li—Se cell.

A special and highly advantageous feature of the inventive method is the notion that this method enables the selenium or metal selenide to be deposited in a thin coating or ultra-fine particle form (thus, providing ultra-short lithium ion diffusion paths and, hence, ultra-fast reaction times for fast battery charges and discharges) while achieving a relatively high proportion of selenium (the active material responsible for storing lithium) and, thus, high specific lithium storage capacity of the resulting cathode active layer in terms of high mAh/g (based on the total weight of the cathode layer, including the masses of the active material, Se, mesoporous structure, binder resin, and conductive filler combined). It is of significance to note that one might be able to use a prior art procedure to deposit small Se particles, but cannot achieve a high Se proportion at the same time, or to achieve a high proportion of Se, but only in large particles or thick film form. The prior art procedures have not been able to achieve both at the same time.

This is why it is such an unexpected and highly advantageous thing to achieve a high selenium loading and yet, concurrently, form an ultra-thin coating or ultra-small diameter particles of selenium. This has not been possible with any prior art selenium loading techniques. For instance, we have been able to deposit nanoscaled selenium particles or coating that occupy a >90% weight fraction of the cathode layer and yet maintain a coating thickness or particle diameter <3 nm. This is quite a feat in the art of lithium-selenium batteries. In another example, we have achieved a >95% Se loading at an average Se coating thickness of 4.5-7.1 nm. These ultra-thin dimensions (3-7 nm) enable facile cathode reactions and nearly perfect selenium utilization efficiency, something that no prior worker has been able to achieve.

It may be noted that one may begin the electrochemical deposition procedure, for instance, with a Se source of $Li_2Se_9$, which may be gradually reduced to $Li_2Se_n$, where 1<n<9. Thus, one may stop the serial reactions at any point of time to obtain various lithium polyselenides. Similarly, one can readily obtain various metal selenides (Na selenides, potassium selenides, etc.).

In certain embodiments, the electrochemical method is conducted in an electrochemical chamber that is outside of an intended alkali metal-selenium cell and the method further contains a step of combining said pre-selenized active cathode layer, an alkali metal anode layer, and an electrolyte to form the alkali metal-selenium cell. In certain other embodiments, the method is conducted inside an intended alkali metal-selenium cell and during the first charge or discharge cycle of the cell.

The present invention also provides a pre-selenized active cathode layer produced by the above-described method and a rechargeable alkali metal-selenium cell (e.g. lithium-selenium battery cell) that contains such a cathode layer. In certain embodiments, the pre-selenized cathode for a rechargeable alkali metal-selenium cell comprises: (A) an integral layer of a mesoporous structure of a carbon, graphite, metal, or conductive polymer, wherein the mesoporous structure has mesoscaled pores of 0.5-50 nm and a specific surface area greater than 100 $m^2$/g and wherein said carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.5 nm, chemically expanded carbon nanofiber, chemically activated carbon nanotube, chemically treated carbon fiber, chemically activated graphite fiber, chemically activated carbonized polymer fiber, chemically treated coke, activated mesophase carbon, mesoporous carbon, electrospun conductive nanofiber, highly separated vapor-grown carbon or graphite nanofiber, highly separated carbon nanotube, carbon nanowire, metal nanowire, metal-coated nanowire or nanofiber, conductive polymer-coated nanowire or nanofiber, or a combination thereof, and (b) nanoparticles or nanocoating of selenium or metal selenide having a diameter or thickness from 0.5 nm to 20 nm, wherein the selenium or metal selenide resides in the mesoscaled pores and occupies an amount from 50% to 99% by weight based on the total weight of the selenium or metal selenide and the integral layer of mesoporous structure combined.

In certain preferred embodiments, the present invention provides a pre-selenized cathode for a rechargeable alkali metal-selenium cell, the cathode comprising (A) an integral layer of a mesoporous structure of a carbon or graphite material, wherein the mesoporous structure has mesoscaled pores with a pore size of 0.5-5.0 nm and a specific surface area from 100 to 3,200 $m^2$/g and wherein the carbon or graphite is selected from chemically etched or expanded soft carbon, chemically etched or expanded hard carbon, exfoliated activated carbon, chemically etched or expanded carbon black, chemically etched multi-walled carbon nanotube, chemically treated multi-walled carbon nanotube with an inter-planar separation no less than 0.5 nm, chemically expanded carbon nanofiber, chemically treated carbon fiber, chemically activated graphite fiber, chemically activated carbonized polymer fiber, chemically treated coke, activated mesophase carbon, mesoporous carbon, electrospun conductive nanofiber, highly separated vapor-grown carbon or graphite nanofiber, highly separated carbon nanotube, or a combination thereof, and (b) nanoparticles or nanocoating of selenium or metal selenide having a diameter or thickness from 0.5 nm to 5.0 nm, wherein the selenium or metal selenide resides in the mesoscaled pores and occupies an amount from 70% to 95% by weight based on the total weight of the selenium or metal selenide and the integral layer of mesoporous structure combined.

Preferably, the particles or filaments of the carbon/graphite/metal/polymer materials in the integral layer of mesoporous structure are chemically bonded together with an adhesive resin. Typically, such a rechargeable alkali metal-selenium cell comprises an anode active material layer, an optional anode current collector, a porous separator and/or an electrolyte, a pre-selenized active cathode layer, and an optional cathode current collector.

In the invented rechargeable alkali metal-selenium cell, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte preferably contains an alkali metal salt (lithium salt, sodium salt, and/or potassium salt) selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature. Common cations of RTILs include, but not limited to tetraalkylammonium, di-, tri-, or tetra-alkylimidazolium, alkylpyridinium, dialkylpyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc.

As examples, the solvent may be selected from ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In an embodiment, the rechargeable alkali metal-selenium cell may further comprise a layer of protective material disposed between the anode and the porous separator, wherein the protective material is a conductor to the intended alkali metal ions (e.g. $Li^+$, $Na^+$, or $K^+$). In a preferred embodiment, the protective material consists of a solid electrolyte.

In an embodiment, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof. This anode active material layer can be optionally coated on an anode current collector (such as Cu foil).

In another embodiment, the lithium-selenium battery cell is an alkali metal ion-selenium cell (e.g. lithium ion-selenium cell, sodium-ion selenium cell, potassium ion-selenium cell) wherein the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof and combinations thereof.

We have discovered that the use of these types of anode active materials (instead of lithium metal foil, for instance) can eliminates the dendrite issue. The resulting battery cells are herein referred to as lithium ion selenium cells, a new breed of lithium-selenium cells.

Although in general not required, the cathode active layer of the rechargeable alkali metal-selenium cell may contain a conductive filler selected from the group consisting of electrospun nanofibers, vapor-grown carbon or graphite nanofibers, carbon or graphite whiskers, carbon nanotubes, carbon nanowires, expanded graphite flakes, metal nanowires, metal-coated nanowires or nanofibers, conductive polymer-coated nanowires or nanofibers, and combinations thereof. In an embodiment, the conductive filler comprises a fiber selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof.

The mesoporous structure makes it possible to make good or full utilization of the cathode active material (i.e. Se-containing material). We have achieved a cathode active material utilization rate >90% or even >99%. In the rechargeable alkali metal-selenium cell, the cathode contains at least 70% by weight of selenium (preferably >80% and further preferably >90%) based on the total weight of said porous graphene structure and selenium combined In the rechargeable alkali metal-selenium cell, the binder material (if desired) is selected from a resin, a conductive polymer, coal tar pitch, petroleum pitch, mesophase pitch, coke, or a derivative thereof.

In the rechargeable alkali metal-selenium cell, the cathode may further comprise additional selenium, selenium-containing molecule, selenium-containing compound, selenium-carbon polymer, or a combination thereof, which is loaded before the cell is manufactured.

The presently invented cell provides a reversible specific capacity of typically no less than 400 mAh per gram based on the total weight of the integral cathode layer (the weights of Se, graphene material, optional binder, and optional conductive filler combined), not just based on the active material weight (selenium) only. Most of the scientific papers and patent documents reported their selenium cathode specific capacity data based on selenium weight only.

More typically and preferably, the reversible specific capacity is no less than 500 mAh per gram and often exceeds 550 or even 600 mAh per gram of entire cathode layer. The high specific capacity of the presently invented cathode, when in combination with a lithium anode, leads to a cell specific energy of no less than 300 Wh/Kg based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 350 Wh/Kg and, in some examples, exceeds 400 Wh/kg.

These and other advantages and features of the present invention will become more transparent with the description of the following best mode practice and illustrative examples.

DETAILED DESCRIPTION OF PREFERRED EMBODIMENTS

Figure 1A:
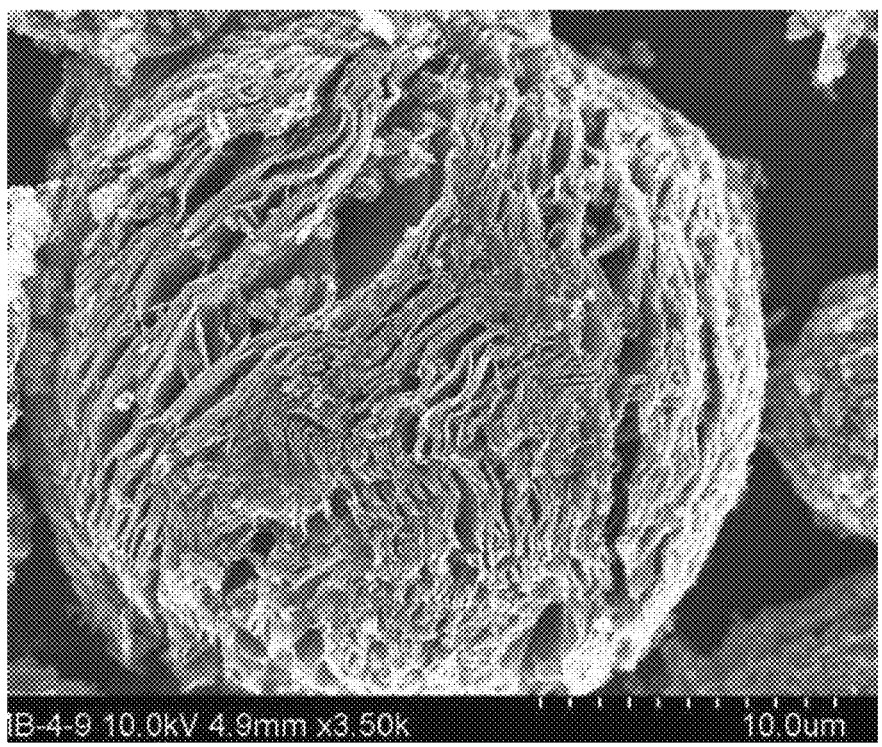
FIG. 1(A) SEM image of a mesoporous graphitic structure prepared by expanding a soft carbon.
Figure 1B:
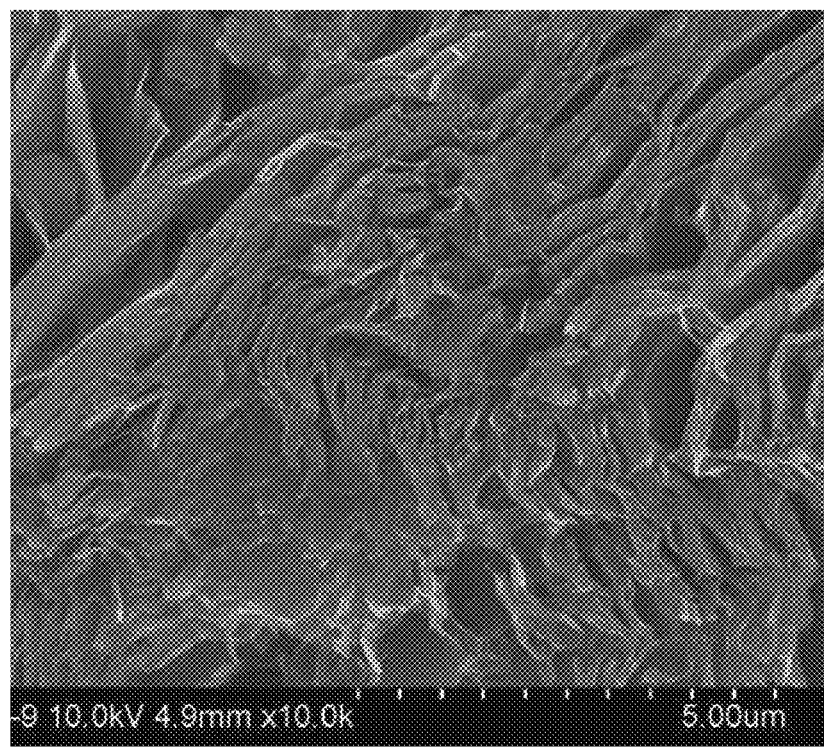
FIG. 1(B) a mesoporous graphitic structure prepared by chemically etching or expanding a hard carbon material.
Figure 1C:
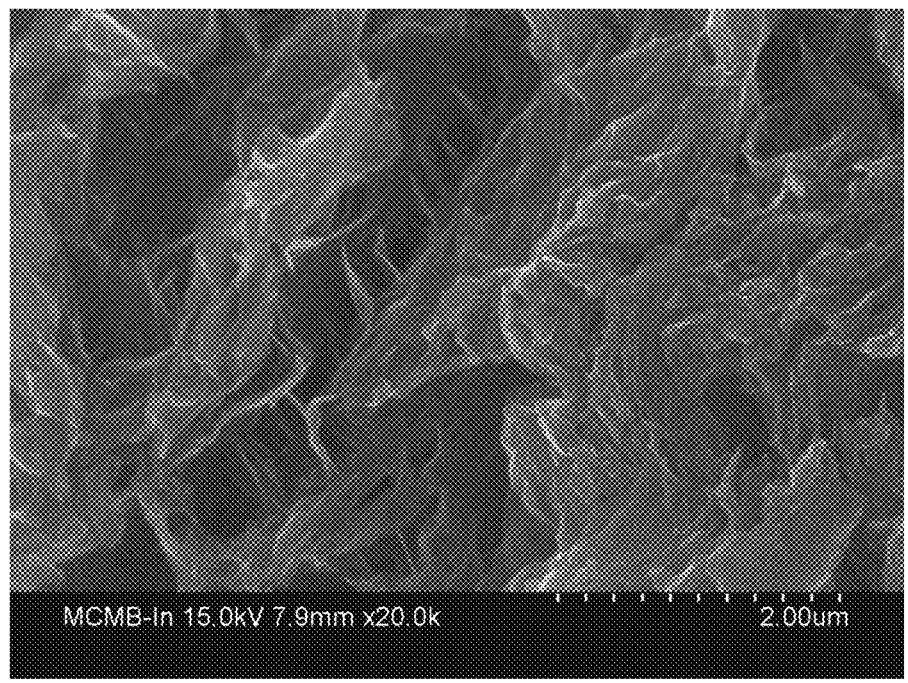
FIG. 1(C) an expanded MCMB.
Figure 1D:
FIG. 1(D) expanded carbon fibers.
Figure 2:
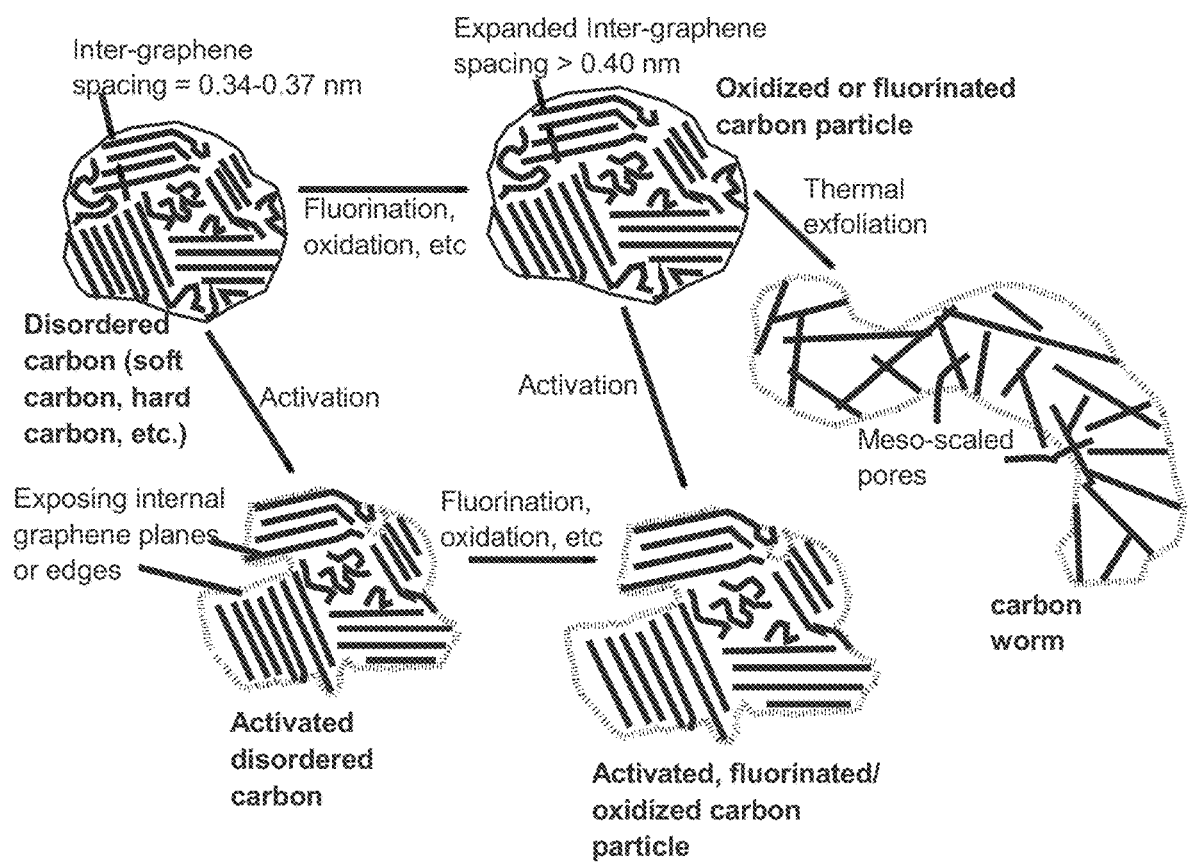
FIG. 2 Schematic of selected procedures for producing activated disordered carbon, oxidized or fluorinated carbon (with an expanded inter-graphene spacing), expanded carbon, and activated/expanded carbon from disordered carbon.
Figure 3:
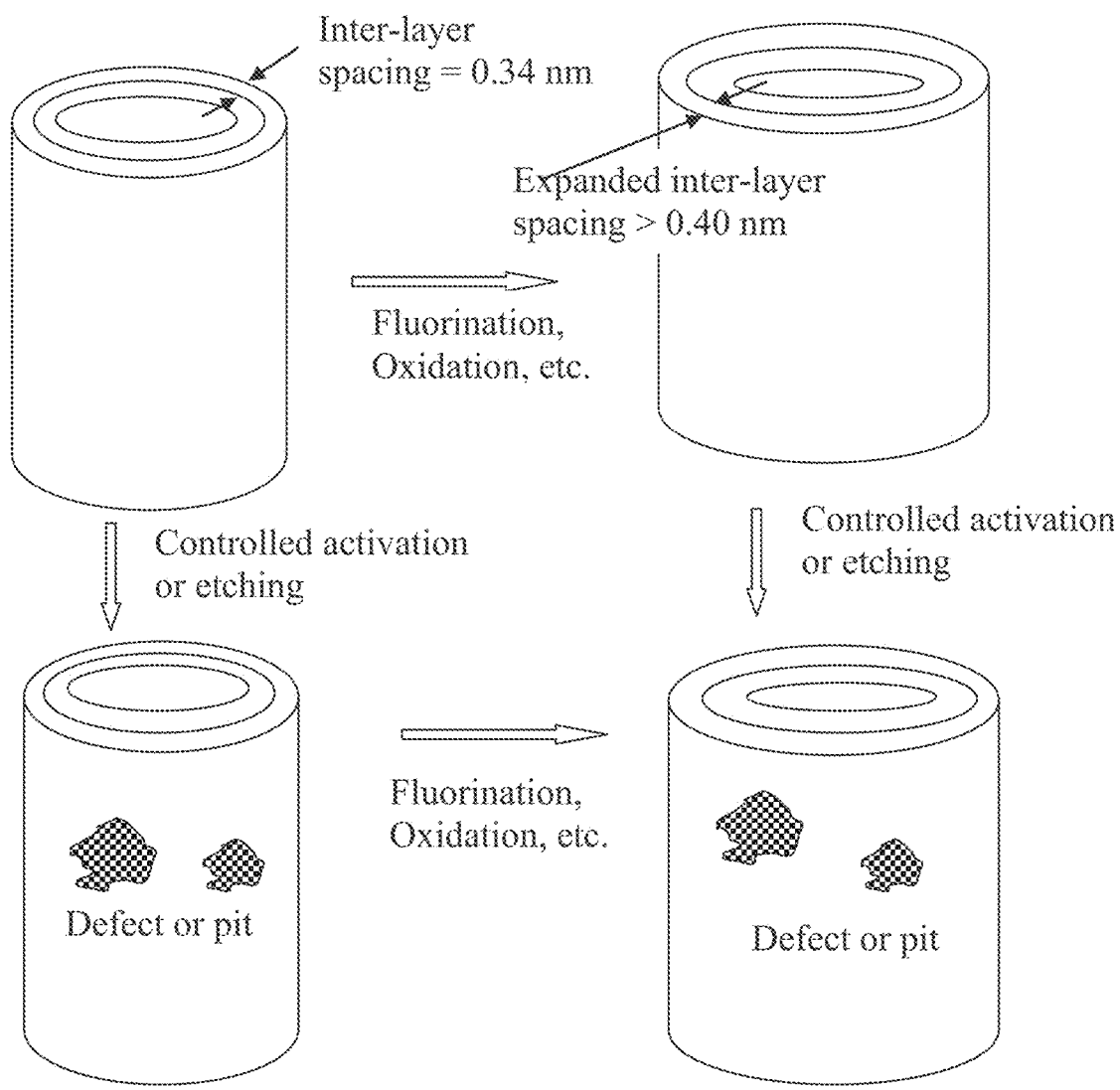
FIG. 3 Schematic of selected procedures for producing activated carbon nanotubes, oxidized or fluorinated CNTs with an expanded inter-graphene spacing, and activated/expanded CNTs from multi-walled CNTs.

For convenience, the following discussion of preferred embodiments is primarily based on cathodes for Li—Se cells, but the same or similar methods are applicable to deposition of Se in the cathode for the Na—Se and K—Se cells. Examples are presented for Li—Se cells, Na—Se cells, and K—Se cells.

A. Alkali Metal-Selenium Cells (Using Lithium-Selenium Cells as an Example)

The specific capacity and specific energy of a Li—Se cell (or Na—Se, or K—Se cell) are dictated by the actual amount of selenium that can be implemented in the cathode active layer (relative to other non-active ingredients, such as the binder resin and conductive filler) and the utilization rate of this selenium amount (i.e. the utilization efficiency of the cathode active material or the actual proportion of S that actively participates in storing and releasing lithium ions). A high-capacity and high-energy Li—Se requires a high amount of Se in the cathode active layer (i.e. relative to the amounts of non-active materials, such as the binder resin, conductive additive, and other modifying or supporting materials) and a high Se utilization efficiency). The present invention provides such a cathode active layer and a method of producing such a cathode active layer, which is a pre-selenized active cathode layer. This method comprises the following four steps, (a)-(d):

a) Preparing an integral layer of mesoporous structure (a porous sheet, paper, web, film, fabric, non-woven, mat, aggregate, or foam) having mesopores, 0.5-50 nm in size) of a carbon, graphite, metal, or polymer material having massive surfaces to accommodate Se thereon with a specific surface area from 100 to 3,200 $m^2/g$ (these surfaces must be accessible to electrolyte). The mesoporous structure has a specific surface area preferably >500 $m^2/g$ and more preferably >750 $m^2/g$, and most preferably >1,000 $m^2/g$.

b) Preparing an electrolyte comprising a solvent (preferably non-aqueous solvent, such as organic solvent and or ionic liquid) and at least a selenium source dissolved or dispersed in the solvent;

c) Preparing an anode; and d) Bringing the integral layer of mesoporous structure and the anode in ionic contact with the electrolyte (e.g. by immersing all these components in a chamber that is external to the intended Li—Se cell, or encasing these three components inside the Li—Se cell) and imposing an electric current between the anode and the integral layer of mesoporous structure (serving as a cathode) with a sufficient current density for a sufficient period of time to electrochemically deposit nanoscaled selenium or metal selenide particles or coating in the mesopores to form the pre-selenized active cathode layer.

The integral layer of a mesoporous structure comprises primarily a carbon, graphite, metal, or conductive polymer selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.5 nm, chemically expanded carbon nanofiber, chemically activated carbon nanotube, chemically treated carbon fiber, chemically activated graphite fiber, chemically activated carbonized polymer fiber, chemically treated coke, activated mesophase carbon, mesoporous carbon, electrospun conductive nanofiber, vapor-grown carbon or graphite nanofiber, carbon or graphite whisker, carbon nanotube, carbon nanowire, metal nanowire, metal-coated nanowire or nanofiber, conductive polymer-coated nanowire or nanofiber, or a combination thereof. Particles and/or fibrils of this material, when packed into an integral electrode layer of mesoporous structure must still exhibit a specific surface area >100 $m^2/g$ that this in direct contact with the electrolyte. The mesopores must be accessible to the electrolyte.

The layer of mesoporous structure may optionally contain 0-49% (preferably 0-30%, more preferably 0-30%, and further preferably 0-10%) by weight of selenium or selenium-containing compound pre-loaded therein, based on the weights of all ingredients in the layer prior to the step (d) of depositing selenium coating or particles in the mesopores. Preferably, zero (0%) selenium or sulfur-containing compound is pre-loaded into the porous graphene structure since this pre-loaded material, if not done properly, can negatively impact the subsequent pre-selenization step.

The Se particles or coating have a thickness or diameter smaller than 20 nm (preferably <10 nm, more preferably <5 nm, and further preferably <3 nm) and wherein the nanoscaled selenium particles or coating occupy a weight fraction of at least 70% (preferably >80%, more preferably >90%, and most preferably >95%) based on the total weights of the selenium particles or coating and the graphene material combined. It is advantageous to deposit as much Se as possible yet still maintain ultra-thin thickness or diameter of the Se coating or particles (e.g. >80% and <3 nm; >90% and <5 nm; and >95% and <10 nm, etc.).

B. Production of Various Mesoporous Structures

The following types of porous structures are found to be particularly suitable for use to support and protect the sulfur coating or particles: a porous sheet, paper, web, film, fabric, non-woven, mat, aggregate, or foam of a carbon or graphite material that has been expanded, activated, chemically treated, and/or expanded. This porous structure can contain chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-graphene planar separation no less than 0.4 nm, chemically expanded carbon nanofiber, chemically activated or expanded carbon nanotube, carbon fiber, graphite fiber, carbonized polymer fiber, coke, mesophase carbon, or a combination thereof. The expanded spacing is preferably >0.6 nm, more preferably >1.0 nm, and most preferably from 1.0 nm to 3.0 nm.

Alternatively, the mesoporous structure may contain a porous, electrically conductive material selected from metal foam, carbon-coated metal foam, graphene-coated metal foam, metal web or screen, carbon-coated metal web or screen, graphene-coated metal web or screen, perforated metal sheet, carbon-coated porous metal sheet, graphene-coated porous metal sheet, metal fiber mat, carbon-coated metal-fiber mat, graphene-coated metal-fiber mat, metal nanowire mat, carbon-coated metal nanowire mat, graphene-coated metal nanowire mat, surface-passivated porous metal, porous conductive polymer film, conductive polymer nanofiber mat or paper, conductive polymer foam, carbon foam, carbon aerogel, carbon xerogel, or a combination thereof. These porous and electrically conductive materials are capable of accommodating sulfur in their pores and, in many cases, capable of protecting the sulfur coating or particles from getting dissolved in a liquid electrolyte, in addition to providing a 3-D network of electron-conducting paths. For the purpose of defining the claims, the instant cathode does not contain those isolated graphene sheets or platelets not supported on metal, carbon, ceramic, or polymer fibers or foams.

Conductive polymer nanofiber mats can be readily produced by electrospinning of a conductive polymer, which can be an intrinsically conductive (conjugate-chain) polymer or a conductive filler-filled polymer. Electrospinning is well-known in the art. The production of carbon foam, carbon aerogel, or carbon xerogel is also well-known in the art.

Particularly useful metal foams include copper foam, stainless steel foam, nickel foam, titanium foam, and aluminum foam. The fabrication of metal foams is well known in the art and a wide variety of metal foams are commercially available. Preferably, the surfaces of metallic foams are coated with a thin layer of carbon or graphene because carbon and graphene are more electrochemically inert and will not get dissolved during the charge/discharge cycles of the cell. Hence, carbon-coated metal foam, graphene-coated metal foam, carbon-coated metal web or screen, graphene-coated metal web or screen, carbon-coated porous metal sheet, graphene-coated porous metal sheet, carbon-coated metal-fiber mat, graphene-coated metal-fiber mat, carbon-coated metal nanowire mat, and graphene-coated metal nanowire mat are preferred current collector materials for use in the rechargeable lithium cell. Also particularly useful are carbon foam, carbon aerogel, and carbon xerogel. These foams may be reinforced with a binder resin, conductive polymer, or CNTs to make a porous structure of good structural integrity.

In one preferred embodiment, highly porous graphitic or carbonaceous materials may be used to make a conductive and protective backbone porous structure prior to impregnating the resulting porous structure with sulfur. In this approach, particles of these materials may be bonded by a binder to form a porous structure of good structural integrity.

In another possible route, porous graphitic or carbonaceous material particles, along with a resin binder, may be coated onto surfaces of a highly porous metal framework with large pores, such as a metal foam, web, or screen, which serves as a backbone for a mesoporous structure. The combined hybrid structure is preferably very porous with a specific surface area significantly greater than 100 $m^2/g$.

The carbonaceous or graphitic material may be selected from chemically treated graphite with an inter-graphene planar separation no less than 0.5 nm (preferably greater than 0.6 nm, more preferably greater than 1.0 nm) which is not exfoliated, soft carbon (preferably, chemically etched or expanded soft carbon), hard carbon (preferably, chemically etched or expanded hard carbon), activated carbon (preferably, exfoliated activated carbon), carbon black (preferably, chemically etched or expanded carbon black), chemically expanded multi-walled carbon nanotube, chemically expanded carbon fiber or nanofiber, or a combination thereof. These carbonaceous or graphitic materials have one thing in common; they all have mesoscaled pores, enabling entry of electrolyte to access their interior planes of hexagonal carbon atoms.

In one preferred embodiment, the mesoporous carbonaceous material may be produced by using the following recommended procedures:

(A) dispersing or immersing a graphitic or carbonaceous material (e.g., powder of mesophase carbon, mesocarbon micro bead (MCMB), soft carbon, hard carbon, coke, polymeric carbon (carbonized resin), activated carbon (AC), carbon black (CB), multi-walled carbon nanotube (MWCNT), carbon nanofiber (CNF), carbon or graphite fiber, mesophase pitch fiber, and the like) in a mixture of an intercalant and/or an oxidant (e.g., concentrated sulfuric acid and nitric acid) and/or a fluorinating agent to obtain a carbon intercalation compound (CIC), graphite fluoride (GF), or chemically etched/treated carbon material; and optionally (B) exposing the resulting CIC, GF, or chemically etched/treated carbon material to a thermal treatment, preferably in a temperature range of 150-600° C. for a short period of time (typically 15 to 60 seconds) to obtain expanded carbon.

Alternatively, after step (A) above, the resulting CIC, GF, or chemically etched/treated carbon material is subjected to repeated rinsing/washing to remove excess chemical. The rinsed products are then subjected to a drying procedure to remove water. The dried CIC, GF, chemically treated CB, chemically treated AC, chemically treated MWCNT, chemically treated CNF, chemically treated carbon/graphite/pitch fiber can be used as a cathode active material of the presently invented high-capacity cell. These chemically treated carbonaceous or graphitic materials can be further subjected to a heat treatment at a temperature preferably in the range of 150-600° C. for the purposes of creating mesoscaled pores (0.5-50 nm) to enable the interior structure being accessed by electrolyte. It may be noted that these interior graphene planes remain stacked and interconnected with one another, but the above-described chemical/thermal treatments facilitate direct access of these interior graphene planes by the electrolyte.

The broad array of carbonaceous materials, such as a soft carbon, hard carbon, polymeric carbon (or carbonized resin), mesophase carbon, coke, carbonized pitch, carbon black, activated carbon, or partially graphitized carbon, are commonly referred to as the disordered carbon material. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nanoscaled features (e.g. having mesoscaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable.

Hard carbon refers to a carbonaceous material composed of small graphite crystals wherein these graphite crystals or stacks of graphene planes inside the material are not oriented in a favorable direction (e.g. nearly perpendicular to each other) and, hence, are not conducive to further merging of neighboring graphene planes or further growth of these graphite crystals or graphene stacks (i.e., not graphitizable).

Carbon black (CB) (including acetylene black, AB) and activated carbon (AC) are typically composed of domains of aromatic rings or small graphene sheets, wherein aromatic rings or graphene sheets in adjoining domains are somehow connected through some chemical bonds in the disordered phase (matrix). These carbon materials are commonly obtained from thermal decomposition (heat treatment, pyrolyzation, or burning) of hydrocarbon gases or liquids, or natural products (wood, coconut shells, etc). These materials per se (without chemical/thermal treatments as described above) are not good candidate cathode materials for the presently invented high-capacity Li-ion cells. Hence, preferably, they are subjected to further chemical etching or chemical/thermal exfoliation to form a mesoporous structure having a pore size in the range of 0.5-50 nm (preferably 2-10 nm). These mesoscaled pores enable the liquid electrolyte to enter the pores and access the graphene planes inside individual particles of these carbonaceous materials.

The preparation of polymeric carbons by simple pyrolysis of polymers or petroleum/coal tar pitch materials has been known for approximately three decades. When polymers such as polyacrylonitrile (PAN), rayon, cellulose and phenol formaldehyde were heated above 300° C. in an inert atmosphere they gradually lost most of their non-carbon contents. The resulting structure is generally referred to as a polymeric carbon. Depending upon the heat treatment temperature (HTT) and time, polymeric carbons can be made to be insulating, semi-conducting, or conducting with the electric conductivity range covering approximately 12 orders of magnitude. This wide scope of conductivity values can be further extended by doping the polymeric carbon with electron donors or acceptors. These characteristics uniquely qualify polymeric carbons as a novel, easy-to-process class of electroactive materials whose structures and physical properties can be readily tailor-made.

Polymeric carbons can assume an essentially amorphous structure or have multiple graphite crystals or stacks of graphene planes dispersed in an amorphous carbon matrix. Depending upon the HTT used, various proportions and sizes of graphite crystals and defects are dispersed in an amorphous matrix. Various amounts of two-dimensional condensed aromatic rings or hexagons (precursors to graphene planes) can be found inside the microstructure of a heat treated polymer such as a PAN fiber. An appreciable amount of small-sized graphene sheets are believed to exist in PAN-based polymeric carbons treated at 300-1,000° C. These species condense into wider aromatic ring structures (larger-sized graphene sheets) and thicker plates (more graphene sheets stacked together) with a higher HTT or longer heat treatment time (e.g., >1,500° C.). These graphene platelets or stacks of graphene sheets (basal planes) are dispersed in a non-crystalline carbon matrix. Such a two-phase structure is a characteristic of some disordered carbon material.

There are several classes of precursor materials to the disordered carbon materials of the instant patent application. For instance, the first class includes semi-crystalline PAN in a fiber form. As compared to phenolic resin, the pyrolized PAN fiber has a higher tendency to develop small crystallites that are dispersed in a disordered matrix. The second class, represented by phenol formaldehyde, is a more isotropic, essentially amorphous and highly cross-linked polymer. The third class includes petroleum and coal tar pitch materials in bulk or fiber forms. The precursor material composition, heat treatment temperature (HTT), and heat treatment time (Htt) are three parameters that govern the length, width, thickness (number of graphene planes in a graphite crystal), and chemical composition of the resulting disordered carbon materials.

In the present investigation, PAN fibers were subjected to oxidation at 200-350° C. while under a tension, and then partial or complete carbonization at 350-1,500° C. to obtain polymeric carbons with various nanocrystalline graphite structures (graphite crystallites). Selected samples of these polymeric carbons were further heat-treated at a temperature in the range of 1,500-2,000° C. to partially graphitize the materials, but still retaining a desired amount of amorphous carbon (no less than 10%). Phenol formaldehyde resin and petroleum and coal tar pitch materials were subjected to similar heat treatments in a temperature range of 500 to 1,500° C. The disordered carbon materials obtained from PAN fibers or phenolic resins are preferably subjected to a chemical etching/expanding treatment using a process commonly used to produce activated carbon (e.g., treated in a KOH melt at 900° C. for 1-5 hours). This chemical treatment is intended for making the disordered carbon mesoporous, enabling electrolyte to reach the edges or surfaces of the constituent aromatic rings after a battery cell is made. Such an arrangement enables the lithium ions in the liquid electrolyte to readily attach onto exposed graphene planes or edges without having to undergo significant solid-state diffusion.

Certain grades of petroleum pitch or coal tar pitch may be heat-treated (typically at 250-500° C.) to obtain a liquid crystal-type, optically anisotropic structure commonly referred to as mesophase. This mesophase material can be extracted out of the liquid component of the mixture to produce isolated mesophase particles or spheres, which can be further carbonized and graphitized.

In general, the cathode active material (including the porous backbone structure and S lodged in the pores) as a whole also preferably form a mesoporous structure with a desired amount of mesoscaled pores (0.5-50 nm, preferably 2-10 nm) to allow the entry of electrolyte. This is advantageous because these pores enable a great amount of surface areas to be in physical contact with electrolyte and capable of capturing Se precipitated from the electrolyte during the subsequent electrochemical deposition and capturing/releasing lithium (sodium or potassium) from/to the electrolyte during subsequent battery charges/discharges. These surface areas of the cathode active material as a whole are typically and preferably >100 m$^2$/g, more preferably >500 m$^2$/g, further more preferably >1,000 m$^2$/g, and most preferably >1,500 m$^2$/g.

C. Deposition of Selenium in Mesopores

Once a layer of mesoporous structure (e.g. a porous sheet, paper, web, film, fabric, non-woven, mat, aggregate, or foam having mesopores, 0.5-50 nm in size) is prepared, this layer can be immersed in an electrolyte (preferably liquid electrolyte), which comprises a solvent and a selenium source dissolved or dispersed in the solvent. This layer basically serves as a cathode in an external electrochemical deposition chamber or a cathode in an intended alkali metal-sulfur cell (encased inside the packaging or casing of a battery).

Subsequently, an anode layer is also immersed in the chamber, or encased inside a battery cell. Any conductive material can be used as an anode material, but preferably this layer contains some lithium (or sodium or potassium). In such an arrangement, the integral layer of mesoporous structure and the anode are in ionic contact with the electrolyte. An electric current is then supplied between the anode and the integral layer of mesoporous structure (serving as a cathode) with a sufficient current density for a sufficient period of time to electrochemically deposit nanoscaled selenium particles or coating in the mesopores to form the pre-selenized active cathode layer. The required current density depends upon the desired speed of deposition and uniformity of the deposited material.

This current density can be readily adjusted to deposit Se particles or coating that have a thickness or diameter smaller than 20 nm (preferably <10 nm, more preferably <5 nm, and further preferably <3 nm). The resulting nanoscaled selenium particles or coating typically and preferably occupy a weight fraction of at least 70% (preferably >80%, more preferably >90%, and most preferably >95%) based on the total weights of the selenium particles or coating and the mesoporous structure combined.

In one preferred embodiment, the selenium source is selected from $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xSe_y$ is selected from $Li_2Se_6$, $Li_2Se_7$, $Li_2Se_8$, $Li_2Se_9$, $Li_2Se_{10}$, $Na_2Se_6$, $Na_2Se_7$, $Na_2Se_8$, $Na_2Se_9$, $Na_2Se_{10}$, $K_2Se_6$, $K_2Se_7$, $K_2Se_8$, $K_2Se_9$, or $K_2Se_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—Se cell.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

For the purpose of internal electrochemical deposition of Se in the mesopores of a cathode layer in a cell, the electrolyte may further comprise a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethysulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

In one preferred embodiment, as previously stated above, the electrochemical deposition is conducted before the cathode active layer is incorporated into a lithium-selenium (Li—Se) battery cell. In other words, the anode, the electrolyte, and the integral layer of mesoporous structure (serving as a cathode layer) are positioned in an external container outside of a lithium-selenium cell. The needed apparatus is similar to an electroplating system. The step of electrochemically depositing nanoscaled selenium particles or coating in the mesopores is conducted outside the lithium-selenium cell and prior to the battery cell fabrication. After this selenium deposition is completed, the pre-selenized integral layer of mesoporous structure is then incorporated into the lithium-selenium cell.

In another embodiment, the anode, the electrolyte, and the integral layer of mesoporous structure are disposed inside a lithium-selenium cell. In other words, the battery cell itself is an electrochemical deposition system for pre-selenization of the cathode and the step of electrochemically depositing nanoscaled selenium particles or coating in the mesopores is conducted after the lithium-selenium cell is fabricated. This electrochemical deposition procedure is conducted during the first charge cycle of the Li—Se cell.

After an extensive and in-depth research effort, we have come to realize that such a pre-selenization surprisingly solves several most critical issues associated with current Li—Se cells. For instance, this method enables the selenium to be deposited in a thin coating or ultra-fine particle form, thus, providing ultra-short lithium ion diffusion paths and, hence, ultra-fast reaction times for fast battery charges and discharges. This is achieved while maintaining a relatively high proportion of selenium (the active material responsible for storing lithium) and, thus, high specific lithium storage capacity of the resulting cathode active layer in terms of high specific capacity (mAh/g, based on the total weight of the cathode layer, including the masses of the active material, Se, supporting graphene sheets, binder resin, and conductive filler).

It is of significance to note that one might be able to use a prior art procedure to deposit small Se particles, but not a high Se proportion, or to achieve a high proportion but only in large particles or thick film form. But, the prior art procedures have not been able to achieve both small Se particles and high Se proportion at the same time. This is why it is such an unexpected and highly advantageous thing to obtain a high selenium loading and yet, concurrently, maintaining an ultra-thin/small thickness/diameter of selenium. This has not been possible with any prior art selenium loading techniques. For instance, we have been able to deposit nanoscaled selenium particles or coating that occupy a >90% weight fraction of the cathode layer and yet maintaining a coating thickness or particle diameter <3 nm. This is quite a feat in the art of lithium-selenium batteries. As another example, we have achieved a >95% Se loading at an average Se coating thickness of 4.5-7.1 nm.

Electrochemists or materials scientists in the art of Li—Se batteries would expect that a greater amount of conductive supporting materials (hence, a smaller amount of Se) in the cathode active layer would be required in order to achieve a better utilization of Se, particularly under high charge/discharge rate conditions. Contrary to these expectations, we have observed that the key to achieving a high Se utilization efficiency is minimizing the Se coating thickness or Se particle size and is independent of the amount of Se loaded into the cathode provided the Se coating or particle thickness/diameter is small enough (e.g. <10 nm, or even better if <5 nm). The problem here is that it has not been possible in prior art to maintain a thin Se coating or small particle size if Se is higher than 50% by weight. Here we have further surprisingly observed that the key to enabling a high specific capacity at the cathode under high rate conditions is to maintain a high Se loading and still keep the Se coating or particle size as small as possible, and this is accomplished by using the presently invented pre-selenization (selenium pre-loading) method.

The electrons coming from or going out through the external load or circuit must go through the conductive additives (in a conventional selenium cathode) or a conductive framework (e.g. the mesoporous structure as herein disclosed) to reach the cathode active material. Since the cathode active material (e.g. selenium or lithium polyselenide) is a poor electronic conductor, the active material particle or coating must be as thin as possible to reduce the required electron travel distance.

Furthermore, the cathode in a conventional Li—Se cell typically has less than 70% by weight of selenium in a composite cathode composed of selenium and the conductive additive/support. Even when the selenium content in the prior art composite cathode reaches or exceeds 70% by weight, the specific capacity of the composite cathode is typically significantly lower than what is expected based on theoretical predictions. For instance, the theoretical specific capacity of selenium is 675 mAh/g. A composite cathode composed of 70% selenium (Se) and 30% carbon black (CB), without any binder, should be capable of storing up to 675×70%=472.5 mAh/g. Unfortunately, the observed specific capacity is typically less than 75% or 354 mAh/g (often less than 50% or 237 mAh/g in this example) of what could be achieved. In other words, the active material utilization rate is typically less than 75% (or even <50%). This has been a major issue in the art of Li—Se cells and there has been no solution to this problem. Most surprisingly, the implementation of massive surfaces associated with a mesoporous structure as a conductive supporting material for selenium or lithium polyselenide has made it possible to achieve an active material utilization rate of typically >>80%, more often greater than 90%, and, in many cases, close to 95%-99%.

Still another unexpected result of the instant method is the observation that thinner Se coating leads to more stable charge/discharge cycling with significantly reduced shuttling effect that has been a long-standing impediment to full commercialization of Li—Se batteries. We overcome this problem yet, at the same time, achieving a high specific capacity. In just about all the prior art Li—Se cells, a higher Se loading leads to a faster capacity decay.

The shuttling effect is related to the tendency for selenium or lithium polyselenide that forms at the cathode to get dissolved in the solvent and for the dissolved species to migrate from the cathode to the anode, where they irreversibly react with lithium to form species that prevent selenide from returning back to the cathode during the subsequent discharge operation of the Li—Se cell (the detrimental shuttling effect). It seems that the mesopores in the presently invented mesoporous structure have been able to prevent or reduce such a dissolution and migration issue.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), lithium-fluoroalkyl-phosphates ($LiPF3(CF_2CF_3)_3$), lithium bisperfluoroethysulfonylimide (LiBETI), an ionic liquid salt. Among them, $LiPF_6$, $LiBF_4$ and $LiN(CF_3SO_2)_2$ are preferred. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulfonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulfonyl) imide, bis(fluorosulfonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—Se cell.

In one embodiment, the cathode layer may be pre-loaded with up to 30% (preferably <15% and more preferably <10%) of an active material (selenium or lithium poly selenide) prior to the cathode layer fabrication. In yet another embodiment, the cathode layer can contain a conductive filler, such as carbon black (CB), acetylene black (AB), graphite particles, activated carbon, mesoporous carbon, mesocarbon micro bead (MCMB), carbon nanotube (CNT), carbon nanofiber (CNF), carbon fiber, or a combination thereof.

The anode active material may contain, as an example, lithium metal foil or a high-capacity Si, Sn, or $SnO_2$ capable of storing a great amount of lithium. The cathode active material may contain pure selenium (if the anode active material contains lithium), lithium polyselenide, or any selenium-containing compound, molecule, or polymer. If the cathode active material includes lithium-containing species (e.g. lithium polyselenide) when the cell is made, the anode active material can be any material capable of storing a large amount of lithium (e.g. Si, Ge, Sn, SiO, $SnO_2$, etc.).

At the anode side, when lithium metal is used as the sole anode active material in a Li—Se cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nanostructure composed of conductive nanofilaments. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting pathways. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electrospinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electrospinning of polyacrylonitrile (PAN) into polymer nanofibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-selenium with a conventional anode configuration: The cell contains an optional cathode current collector, a presently invented cathode layer, a separator/electrolyte, and an anode current collector. Potential dendrite formation may be overcome by using the high-concentration electrolyte at the anode.

(B) Lithium metal-selenium cell with a nanostructured anode configuration: The cell contains an optional cathode current collector, a cathode herein invented, a separator/electrolyte, an optional anode current collector, and a nanostructure to accommodate lithium metal that is deposited back to the anode during a charge or re-charge operation. This nanostructure (web, mat, or paper) of nanofilaments provide a uniform electric field enabling uniform Li metal deposition, reducing the propensity to form dendrites. This configuration can provide a dendrite-free cell for a long and safe cycling behavior.

(C) Lithium ion-selenium cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-selenium cell with a nanostructured anode: For instance, the cell contains a web of nanofibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion selenium cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector. This cathode current collector is optional because the presently invented layer of porous graphene structure, if properly designed, can act as a current collector or as an extension of a current collector.

For a sodium ion-selenium cell or potassium ion-selenium cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) Sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof; (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Mesoporous Soft Carbon as a Supporting and Protective Backbone for Selenium It may be noted at the outset that "soft carbon" is commonly defined as the carbonaceous material that is graphitizable. By contrast, a hard carbon is a carbonaceous material that cannot be graphitized even after heat treatments at a temperature as high as 2,500-3,200° C. Chemically etched or expanded soft carbon was prepared from heat-treating a liquid crystalline aromatic resin (50/50 mixture of anthracene and pyrene) at 200° C. for 1 hour. The resin was ground with a mortar and calcined at 900° C. for 2 h in a $N_2$ atmosphere to prepare the soft carbon. The resulting soft carbon was mixed with small tablets of KOH (four-fold weight) in an alumina melting pot. Subsequently, the soft carbon containing KOH was heated at 750° C. for 2 h in $N_2$. Upon cooling, the alkali-rich residual carbon was washed with hot water until the outlet water reached a pH value of 7. The resulting chemically etched or expanded soft carbon was dried by heating at 60° C. in a vacuum for 24 hours. This material can be used in both the anode and the cathode due to its high specific surface area and its ability to capture and store lithium atoms on its surfaces. These surfaces (inside pores) were also found to be particularly suitable for supporting selenium or metal selenide nanocoating or nanoparticles.

Example 2: Expanded "Activated Carbon" (E-AC) as a Supporting and Protective Porous Backbone for Selenium Activated carbon (AC, from Ashbury Carbon Co.) was treated with an acid solution (sulfuric acid, nitric acid, and potassium permanganate at a ratio of 4:1:0.05) for 24 hours. Upon completion of the reaction, the mixture was poured into deionized water and filtered. The treated AC was repeatedly washed in a 5% solution of HCl to remove most of the sulfate ions. The sample was then washed repeatedly with deionized water until the pH of the filtrate was neutral. The slurry was then dried in a vacuum oven pre-set at 70° C. for 24 hours. The dried sample was then placed in a tube furnace at 1,050° C. for 2 minutes to obtain expanded AC. This material can be used in both the anode and cathode of a lithium cell due to its high specific surface area and ability to capture and store Li atoms on its internal surfaces inside the pores. These surfaces were also found to be particularly suitable for supporting selenium or metal selenide nanocoating or nanoparticles in mesopores.

Example 3: Chemically Treated (Expanded) Needle Coke as a Supporting and Protective Porous Backbone for Selenium Anisotropic needle coke has a fully developed needle-shape texture of optical anisotropy. Volatile species of the raw coke was estimated to be around 5 wt. %. Chemical activation was carried out using KOH in a reaction apparatus that consisted of a stainless steel tube and a nickel sample holder. KOH activation was carried out at 800° C. for 2 h under Ar flow. The coke/KOH ratio was varied between 1/1 and 1/4. Upon cooling, the alkali-rich coke was washed with hot water until the outlet water reached a pH value of 7. The resulting chemically etched or expanded coke was dried by heating at 60° C. in a vacuum for 24 hours. The treated coke is highly porous, having a pore size range of approximately 1-85 nm.

Example 4: Chemically Treated (Expanded) Petroleum Pitch-Derived Hard Carbon as a Supporting and Protective Porous Backbone A pitch sample (A-500 from Ashland Chemical Co.) was carbonized in a tube furnace at 900° C. for 2 hours, followed by further carbonization at 1,200° C. for 4 hours. KOH activation was carried out at 800° C. for 2 h under Ar flow to open up the internal structure of pitch-based hard carbon particles. The hard carbon-based porous structure was found to have a pore size range of 3-100 nm (mostly <50 nm) and to be particularly suitable for supporting and protecting selenium or metal selenide nanocoating or nanoparticles lodged therein.

Example 5: Chemically Activated Mesophase Carbon and Production of Fluorinated Carbon as a Supporting and Protective Porous Backbone Mesocarbon carbon particles (un-graphitized MCMBs) were supplied from China Steel Chemical Co. This material has a density of about 1.8-2.2 g/cm$^3$ with a median particle size of about 16 μm. This batch of mesophase carbon was divided into two samples. One sample was immersed in $K_2CO_3$ at 900° C. for 1 h to form chemically activated mesocarbon. The chemically activated mesophase carbons showed a BET specific surface area of 1,420 m$^2$/g. This material can be used in both the anode and cathode due to its high specific surface area and ability to capture and store metal atoms on its surfaces. These surfaces were found to be particularly suitable for supporting and protecting Se nanocoating or particles.

Another sample was subjected to a fluorination treatment. The mesophase carbon particles were mixed with a PVDF binder in a NMP solution and coated onto an Al foil to form an electrode sheet. This electrode sheet was used as a working electrode in an electrochemical fluorination treatment apparatus consisting of a PTFE beaker, a Pt plate counter electrode, a Pd wire as a reference electrode, and $(C_2H_5)_3N$-3HF as electrolyte. The fluorination procedure was carried out at room temperature by potential sweeping from −1.0 V to 1.0 V at a 20 mV/s scan rate. X-ray diffraction data indicate that the inter-graphene spacing has been increased from 0.337 nm to 0.723 nm.

Example 6: Graphitic Fibrils from Pitch-Based Carbon Fibers for Forming a Porous Backbone Fifty grams of graphite fibers from Amoco (P-55S) were intercalated with a mixture of sulfuric acid, nitric acid, and potassium permanganate at a weight ratio of 4:1:0.05 (graphite-to-intercalate ratio of 1:3) for 24 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. The sample was then submitted to a mechanical shearing treatment in a rotating-blade dissolver/disperser for 10 minutes. The resulting graphitic fibrils were examined using SEM and TEM and their length and diameter were measured. Graphitic fibrils, alone or in combination with another particulate carbon/graphite material, can be packed into a mesoporous structure for supporting selenium and metal polyselenide.

Example 7: Expanded Multi-Walled Carbon Nanotubes (MWCNTs) as a Supporting and Protective Porous Backbone Fifty grams of MWCNTs were chemically treated (intercalated and/or oxidized) with a mixture of sulfuric acid, nitric acid, and potassium permanganate at a weight ratio of 4:1:0.05 (graphite-to-intercalate ratio of 1:3) for 48 hours. Upon completion of the intercalation reaction, the mixture was poured into deionized water and filtered. The sample was then washed with 5% HCl solution to remove most of the sulfate ions and residual salt and then repeatedly rinsed with deionized water until the pH of the filtrate was approximately 5. The dried sample was then exposed to a heat shock treatment at 950° C. for 45 seconds. Expanded MWCNTs, alone or in combination with another particulate carbon/graphite material, can be packed into a mesoporous structure for supporting the selenium material.

Example 8: Conductive Web of Filaments from Electrospun PAA Fibrils as a Supporting Layer for the Anode Poly (amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV d.c. power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nanofibers with an average fibril diameter of 67 nm. Such a web can be used as a conductive substrate for an anode active material. We observe that the implementation of a network of conductive nanofilaments at the anode of a Li—Se cell can effectively suppress the initiation and growth of lithium dendrites that otherwise could lead to internal shorting.

Example 9: Electrochemical Deposition of Se on Various Webs or Paper Structures (External Electrochemical Deposition) for Li—Se, Na—Se, and K—Se Batteries The electrochemical deposition may be conducted before the cathode active layer is incorporated into an alkali metal-selenium battery cell (Li—Se, Na—Se, or K—Se cell). In this approach, the anode, the electrolyte, and the integral layer of mesoporous structure (serving as a cathode layer) are positioned in an external container outside of a lithium-selenium cell. The needed apparatus is similar to an electroplating system, which is well-known in the art.

In a typical procedure, a metal polyselenide ($M_xSe_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polyselenide in this desired solvent. A greater solubility would mean a larger amount of selenium can be derived from the electrolyte solution.

The electrolyte solution is then poured into a chamber or reactor under a dry and controlled atmosphere condition (e.g. He or Nitrogen gas). A metal foil can be used as the anode and a layer of the mesoporous structure as the cathode; both being immersed in the electrolyte solution. This configuration constitutes an electrochemical deposition system. The step of electrochemically depositing nanoscaled selenium particles or coating in the mesopores is conducted at a current density preferably in the range of 1 mA/g to 10 A/g, based on the layer weight of the mesoporous structure.

The chemical reactions that occur in this reactor may be represented by the following equation: $M_xSe_y \rightarrow M_xSe_{y-z} + zSe$ (typically z=1-4). Quite surprisingly, the precipitated Se is preferentially nucleated and grown on massive internal surfaces of mesopores to form nanoscaled coating or nanoparticles. The coating thickness or particle diameter and the amount of Se coating/particles may be controlled by the specific surface area, electrochemical reaction current density, temperature and time. In general, a lower current density and lower reaction temperature lead to a more uniform distribution of Se and the reactions are easier to control. A longer reaction time leads to a larger amount of Se deposited on graphene surfaces and the reaction is ceased when the selenium source is consumed or when a desired amount of Se is deposited.

Example 10: Electrochemical Deposition of Se on Various Mesoporous Webs or Paper-Based Cathode Structures in Li—Se, Na—Se, or K—Se Batteries (Internal Electrochemical Deposition)

As an alternative to the external electrochemical deposition, an internal electrochemical conversion and deposition of Se from an electrolyte-borne selenium source onto massive internal surfaces of mesoporous structures was also conducted using a broad array of mesoporous structures. As a typical procedure, the anode, the electrolyte, and the integral layer of mesoporous structure are packaged inside a housing to form a lithium-selenium cell. In such a configuration, the battery cell itself is an electrochemical deposition system for pre-selennization of the cathode and the step of electrochemically depositing nanoscaled selenium particles or coating on the internal surfaces occurs after the lithium-selenium cell is fabricated and conducted during the first charge cycle of the Li—Se cell.

As a series of examples, lithium polyselenide ($Li_xSe_y$)- and sodium polyselenide ($Na_xSe_y$)-containing electrolytes with desired x and y values (e.g. x=2, and y=6-10) dissolved in solvent were prepared by chemically reacting stoichiometric amounts of selenium and $Li_2Se$ or $Na_2Se$ in polyselenide free electrolyte of 0.5 M LiTFSI+0.2 M $LiNO_3$ (or 0.5 M NaTFSI+0.2 M $NaNO_3$) in DOL/DME (1:1, v:v). The electrolyte was stirred at 75° C. for 3-7 hours and then at room temperature for 48 hours. The resulting electrolytes contain different $Li_xSe_y$ or $Na_xSe_y$ species (e.g. x=2, and y=6-10, depending upon reaction times and temperatures), which are intended for use as a selenium source in a battery cell.

In a Li—Se or Na—Se cell, one of these electrolytes was selected to combine with an anode current collector (Cu foil), an anode layer (e.g. Li metal foil or Na particles), a porous separator, a layer of porous graphene structure, and a cathode current collector (Al foil) to form a Li—Se or room temperature Na—Se cell. The cell was then subjected to a first charge procedure using a current density ranging from 5 mA/g to 50 A/g. The best current density range was found to be from 50 mA/g to 5 A/g.

Examples of the metal polysulfide ($M_xSe_y$) materials, solvents, graphene materials, and exfoliated graphite materials used in the present study are presented in Table 1 below:

TABLE 1

Selected examples of the metal polyselenide materials, solvents, mesoporous structure materials used in the present study.

| Selenium source ($M_xSe_y$) | Solvent | Li/Na/K salts | Type of mesoporous structure in the cathode |
|---|---|---|---|
| $Li_2Se_6$ | DOL/DME | LiTFSI | CSC, CHC, EAC, CCB |
| $Li_2Se_9$ | DOL/DME | LiTFSI | CSC, CHC, EAC, CCB |
| $Na_2Se_5$ | Tetra ethylene glycol dimethyl ether (TEGDME) | NaTFSI | C-CNT, N-CNT, B-CNT, D-CNT, I-CNT |
| $Na_2Se_6$ | TEGDME | NaTFSI | C-CNT, CCF, CGF, CC-PF |
| $K_2Se_6$ | TEGDME | KTFSI | C-coke, A-MC, MC, ES-NF, VG-CNF, VG-GNF |
| $MgSe_6$ | Diglyme/ tetraglyme | $[Mg_2Cl_3][HMDSAlCl_3]$ (HMDS = hexamethyldisilazide) | M-NW, MC-NW, CP-NW, CP-NF |
| $MgSe_4$ | Diglyme/ tetraglyme | $[Mg_2Cl_3][HMDSAlCl_3]$ (HMDS = hexamethyldisilazide) | CSC, CHC, EAC, CCB |
| $CuSe_2$ | $NH_4OH$ or HCl or $H_2SO_4$ | $CuCl_2$ | C-CNT, N-CNT, B-CNT, D-CNT, I-CNT |
| $Cu_8Se_5$ | $NH_4OH$ or HCl or $H_2SO_4$ | $CuCl_2$ | CSC, CHC, EAC, CCB |
| ZnSe | $H_2SO_4$ solution | $ZnSO_4$ | CSC, CHC, EAC, CCB |
| $Al_2Se_3$ | $H_2SO_4$ | $Al_2(SO_4)_3$ | C-CNT, CCF, CGF, CC-PF |

TABLE 1-continued

Selected examples of the metal polyselenide materials, solvents,
mesoporous structure materials used in the present study.

| Selenium source ($M_xSe_y$) | Solvent | Li/Na/K salts | Type of mesoporous structure in the cathode |
|---|---|---|---|
| SnSe$_2$ | HNO$_3$ and HCl | SnCl$_2$ | C-coke, A-MC, MC, ES-NF, VG-CNF, VG-GNF |
| SnSe | HCl | SnCl$_2$ | C-coke, A-MC, MC, ES-NF, VG-CNF, VG-GNF |

Several series of Li metal-Se, Na metal-Se, Na-ion Se, and Li-ion Se cells were prepared using the presently prepared cathode. The first series is a Li or Na metal cell containing a copper foil as an anode current collector and the second series is also a Li or Na metal cell having a nanostructured anode of conductive filaments (based on electrospun carbon fibers) plus a copper foil current collector. The third series is a Li-ion cell having a nanostructured anode of conductive filaments (based on electrospun carbon fibers coated with a thin layer of Si using CVD) plus a copper foil current collector. The fourth series is a Li-ion cell having a graphite-based anode active material as an example of the more conventional anode.

Comparative Examples 10a: Mixing of Selenium with Graphene Sheets or Activated Carbon Particles Via Ball-Milling Selenium particles and graphene sheets (0% to 49% by weight of Se in the resulting composite) were physically blended and then subjected to ball milling for 2-24 hours to obtain Se-graphene composite particles (typically in a ball or potato shape). For comparison, graphene sheets only (without Se) were also ball-milled to obtain ball- or potato-shaped graphene particles. The particles, containing various Se contents, were then made into a layer of graphene structure intended for use in the cathode. Another series of samples for comparison were made under similar processing conditions, but with activated carbon particles replacing graphene sheets.

Example 11: Some Examples of Electrolytes Used

A wide range of lithium salts can be dissolved in a wide array of solvents, individually or in a mixture form. Both ether- and carbonate-based solvents are suitable for use in an electrolyte for a Li—Se cell. The following are good choices for lithium salts that are dissolved well to a high concentration in selected solvents: lithium borofluoride (LiBF$_4$), lithium trifluoro-metasulfonate (LiCF$_3$SO$_3$), lithium bis-trifluoromethyl sulfonylimide (LiN(CF$_3$SO$_2$)$_2$ or LITFSI), lithium bis(oxalato)borate (LiBOB), lithium oxalyldifluoroborate (LiBF$_2$C$_2$O$_4$), and lithium bisperfluoroethy-sulfonylimide (LiBETI). These selected solvents are DME/DOL mixture, TEGDME/DOL, PEGDME/DOL, and TEGDME. A good electrolyte additive for helping to stabilize Li metal is LiNO$_3$. Useful sodium salts and potassium salts include sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), and bis-trifluoromethyl sulfonylimide potassium (KN(CF$_3$SO$_2$)$_2$). Good solvents are DME/DOL mixture, TEGDME/DOL, PEGDME/DOL, and TEGDME.

Room temperature ionic liquids (RTILs) are of great interest due to their low volatility and non-flammability. Particularly useful ionic liquid-based electrolyte systems include: lithium bis(trifluoro methanesulfonyl)imide in a N-n-butyl-N-ethylpyrrolidinium bis(trifluoromethane sulfonyl)imide (LiTFSI in BEPyTFSI), N-methyl-N-propylpiperidinium bis(trifluoromethyl sulfonyl)imide (PP$_{13}$TFSI) containing LiTFSI, N,N-diethyl-N-methyl-N-(2-methoxyethyl) ammonium bis(trifluoromethylsulfonyl)imide (DEMETFSI) containing LiTFSI,.

Example 12: Evaluation of Electrochemical Performance of Various Li—Se, Na—Se, and K—Se Cells Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 4:
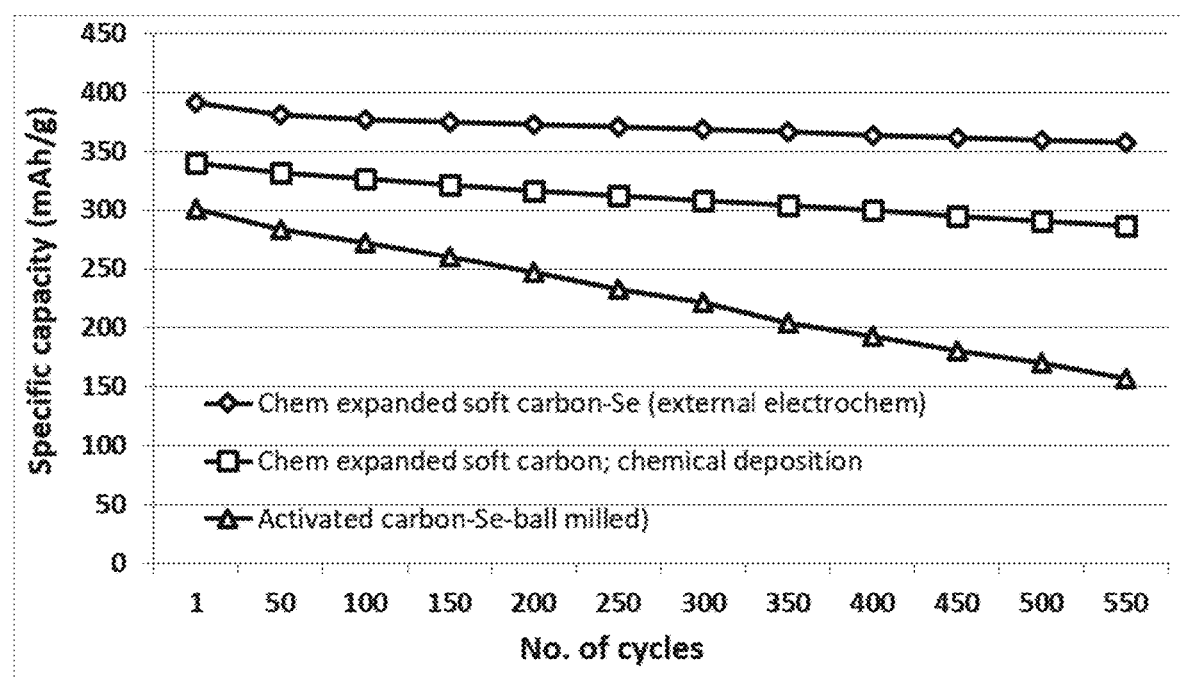
FIG. 4 The charge and discharge cycling results of three Li—Se cells, one containing a presently invented cathode structure prepared by the external electrochemical deposition of selenium into a mesoporous structure of chemically expanded soft carbon (C-SC), the second cell containing a cathode prepared by using chemical deposition of selenium in a comparable mesoporous structure, and the third containing a cathode material prepared by ball-milling a mixture of Se powder and activated carbon powder.

Shown in FIG. 4 are charge and discharge cycling results of three Li—Se cells, one featuring a chemically treated soft carbon (C-SC)-based cathode containing electrochemically deposited selenium coating of the present invention, one containing chemically deposited selenium in C-SC, and the third containing a cathode material prepared by ball-milling a mixture of Se powder and activated carbon powder. The discharge capacities of the above three cells are plotted as a function of the number of charge-discharge cycles. The cathode layers in the three Li—Se cells were designed to have approximately 65% by weight of Se deposited therein. Presumably, the resulting composite or hybrid cathode of each cell should exhibit a maximum specific capacity of 675×65%=439 mAh/g. However, the cathode layer prepared by chemical deposition of Se exhibits a specific capacity of only 340 mAh/g, which means a Se utilization efficiency of 340/439=77.4%. The cathode layer prepared by ball milling of AC-Se powder mixture exhibits a specific capacity of only 301 mAh/g, which means a Se utilization efficiency of 301/439=68%. In contrast, the cathode layer having electrochemically deposited Se coating (thickness 6.5 nm) prepared according to an embodiment of the instant invention delivers an Se utilization efficiency of 391/439=89%. This dramatic difference in efficiency is truly stunning. Data from many more samples investigated are summarized in Table 2 below:

TABLE 2

Selenium utilization efficiency data for alkali metal-selenium cell cathodes containing various Se contents, Se coating thicknesses or particle diameters, substrate materials, and Se deposition methods.

| Sample ID | Cathode active layer material | % of Se and thickness or diameter (nm) | Cathode discharge capacity (mAh/g) | Discharge capacity, mAh/g, based on Se weight | Se utilization efficiency |
|---|---|---|---|---|---|
| CSC-1 | CSC | 95% Se; 6.1 nm | 575 | 605 | 89.67% |
| CSC-2 | CSC | 95% Se; 3.4 nm | 584 | 615 | 91.07% |
| CSC-3 | CSC | 75% Se; 7.1 nm | 423 | 564 | 83.56% |
| CSC-c1 | CSC | 75% Se (solution) | 365 | 487 | 72.10% |
| CSC-c2 | CSC | 75% Se + CSC; ball-milled | 320 | 427 | 63.21% |
| CSC-c3 | SC, non-treated | 75% Se; external | 388 | 517 | 76.64% |
| CHC-1 | CHC | 70% Se, External | 440 | 629 | 93.12% |
| CHC-c1 | CHC | 70% Se, Chemical reaction | 354 | 506 | 74.92% |
| EAC-1 | EAC | 70% Se, External | 435 | 621 | 92.06% |
| EAC-c1 | EAC | 70% Se, solution | 348 | 497 | 73.65% |
| C-CNT1 | C-CNT | 70% Se, External | 430 | 614 | 91.01% |
| C-CNT2 | C-CNT | 70% Se, in a cell | 418 | 597 | 88.47% |
| C-CNT-c1 | C-CNT | 70% Se; solution deposition | 337 | 481 | 71.32% |
| C-CNT-c3 | CNT, non-treated | 70% Se; External | 352 | 503 | 74.50% |
| A-MC1 | A-MC | 85% Se; 9.2 nm, in a cell | 520 | 612 | 90.63% |
| A-MC-2 | A-MC | 85% Se; 19.2 nm, external | 523 | 615 | 91.15% |
| A-MC-c1 | A-MC | 85% Se; Chemical reaction | 475 | 559 | 82.79% |
| A-MC-c2 | MC, non-treated | 85% Se: external | 519 | 611 | 90.46% |
| C-coke1 | C-coke | 85% Se; external | 526 | 619 | 91.68% |
| C-coke2 | C-coke | 85% Se; solution | 423 | 498 | 73.73% |

The following observations can be made from the data of Table 2:
1) Thinner coatings prepared according to the instant invention lead to higher efficiency of Se utilization given comparable Se proportion. Given comparable Se coating thickness, the Se utilization efficiency is relatively independent of the Se proportion deposited in the mesopores.
2) The presently invented electrochemical deposition method is significantly more effective than all conventional methods (solution deposition, ball-milling, chemical reaction-based deposition, etc.) in terms of imparting Se utilization efficiency to the resulting cathode structure of a Li—Se, Na—Se, or K—Se cell.
3) Both external electrochemical deposition and internal electrochemical deposition are capable of depositing a high Se proportion while maintaining a thin Se coating (hence, high Se utilization efficiency). Prior art methods are not capable of achieving both.

The data shown in FIG. 4 also indicate that the presently invented Li—Se cell does not exhibit any significant decay (only 8.7%) even after 550 cycles. In contrast, the prior art cell containing ball-milled Se/AC cathode suffers a 43.5% capacity decay after 550 cycles. In fact, it suffers a 20% capacity decay after 220 cycles. The cycle life of a lithium battery cell is usually defined as the number of cycles when the cell reaches a 20% capacity decay. These results are quite unexpected considering that the same type of chemically treated SC was used as the supporting material and the same amount of selenium was used in these three cell cathodes.

Figure 5:
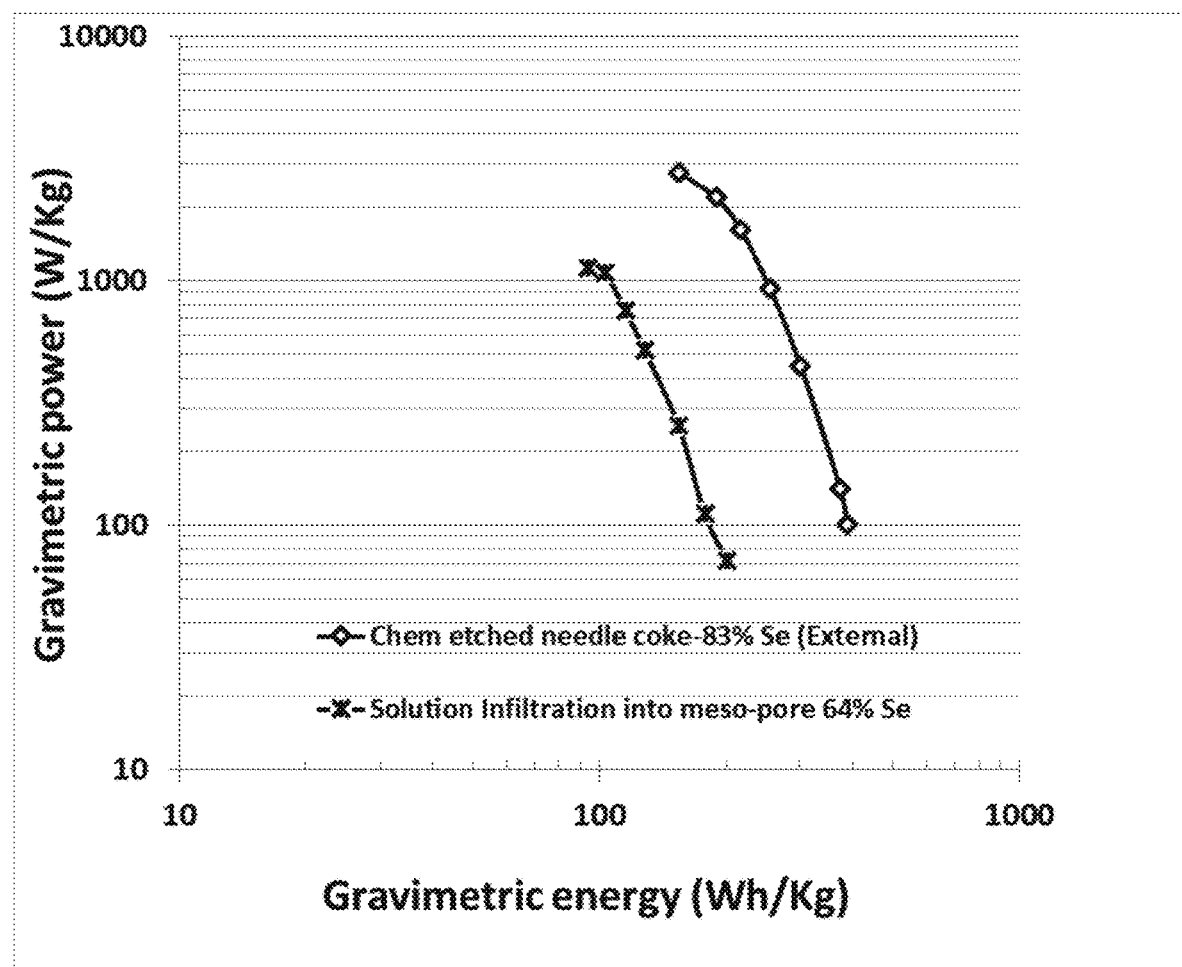
FIG. 5 Ragone plots (cell power density vs. cell energy density) of two Li metal-selenium cells: chemically etched needle coke-based cathode containing electrochemically deposited selenium particles (83% Se), and chemical deposition of Se into pores of the same mesoporous structure (64% Se).

FIG. 5 shows Ragone plots (cell power density vs. cell energy density) of two Li—Se cells. The presently invented Li—Se cell featuring a chemically treated/expanded needle coke (C-NC)-based cathode containing electrochemically deposited selenium particles (83% by weight of Se) exhibits an exceptional cell energy density (as high as 389 Wh/kg, based on total cell weight). The same cell also delivers a maximum power density as high as 2768 W/kg, which is significantly higher than typical power densities (up to 500 W/kg) of lithium-ion batteries.

In contrast, the C-NC-based cathode containing chemically deposited selenium particles (64% Se) enables the Li—Se cell to store up to 201 Wh/kg and delivers a maximum power density of 1,123 W/kg. These are significantly lower than those of the presently invented cell. These data have clearly demonstrated the unexpected yet superior effectiveness of the presently invented external and internal electrochemical deposition methods and the chemical treatment or expansion approach.

Figure 6:
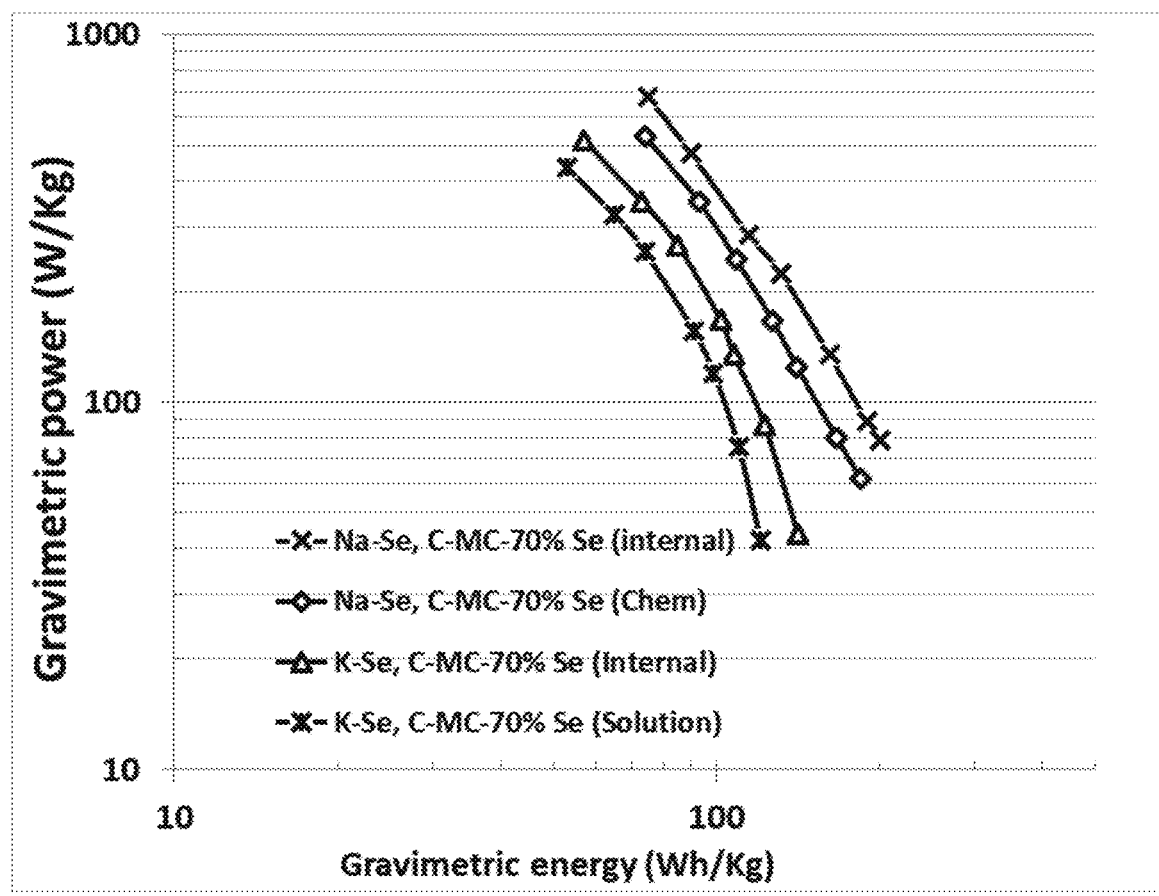
FIG. 6 Ragone plots (cell power density vs. cell energy density) of 4 alkali metal-selenium cells: Na—Se cell featuring a chemically expanded mesocarbon (C-MC)-based cathode containing electrochemically deposited selenium particles (70% Se), Na—Se cell featuring a C-MC-based cathode containing chemically deposited Se particles (70% Se), K—Se cell featuring a C-MC-based cathode containing electrochemically deposited Se particles (70% Se), and K—Se cell featuring a C-MC-based cathode containing solution-deposited Se particles (70% Se).

Shown in FIG. 6 are Ragone plots (cell power density vs. cell energy density) for 4 alkali metal-selenium cells. The first cell is a Na—Se cell featuring a chemically treated mesocarbon (C-MC)-based cathode containing electrochemically deposited selenium particles (70% Se), which exhibits the highest energy density and power density among the four cells. The second is a Na—Se cell featuring a C-MC-based cathode containing chemically deposited selenium particles (70% Se). Clearly, the cathode having chemically deposited Se is not as effective as the presently invented cathode of electrochemically deposited Se in providing high energy density and power density. The third cell is a K—Se cell featuring a C-CMC-based cathode containing electrochemically deposited selenium particles (70% Se), and the fourth cell is a K—Se cell featuring a C-CMC-based cathode containing solution-deposited selenium particles (70% Se). Again, the presently invented electrochemical method is so much superior. The data in FIG. 6 also indicate that the presently invented Na—Se cells can store an energy density up to 201 Wh/kg, which is higher than those of Li-ion batteries. Additionally, even K—Se cells can store up to 142 Wh/kg, better than most of the Li-ion cells. These highly surprising results are a good testament to the effectiveness of the presently invented method of depositing selenium in the pores of a mesoporous structure.

In summary, the present invention provides an innovative, versatile, and surprisingly effective platform materials technology that enables the design and manufacture of superior alkali metal-selenium rechargeable batteries. The alkali metal-selenium cell featuring a cathode containing a mesoporous structure having pores of 0.5-50 nm with ultra-thin selenium electrochemically deposited therein exhibits a high cathode active material utilization rate, high specific capacity, high specific energy, high power density, little or no shuttling effect, and long cycle life. When a similarly configured anode structure (with no selenium) or a nano-structured carbon filament web is implemented at the anode to support a lithium film (e.g. foil), the lithium dendrite issue is also suppressed or eliminated.

The invention claimed is:

1. An electrochemical method of producing a pre-selenized active cathode layer for a rechargeable alkali metal-selenium cell, said method comprising:
    (a) preparing an integral layer of a mesoporous structure of a carbon, graphite, metal, or conductive polymer, wherein said mesoporous structure has mesoscaled pores of 0.5-50 nm and a specific surface area greater than 100 m$^2$/g and wherein said carbon, graphite, metal, or conductive polymer is selected from chemically etched or expanded soft carbon, chemically etched or expanded hard carbon, exfoliated activated carbon, chemically etched or expanded carbon black, chemically etched multi-walled carbon nanotube, nitrogen-doped carbon nanotube, boron-doped carbon nanotube, chemically doped carbon nanotube, ion-implanted carbon nanotube, chemically treated multi-walled carbon nanotube with an inter-planar separation no less than 0.5 nm, chemically expanded carbon nanofiber, chemically activated carbon nanotube, chemically treated carbon fiber, chemically activated graphite fiber, chemically activated carbonized polymer fiber, chemically treated coke, activated mesophase carbon, mesoporous carbon, electrospun conductive nanofiber, highly separated vapor-grown carbon or graphite nanofiber, highly separated carbon nanotube, carbon nanowire, metal nanowire, metal-coated nanowire or nanofiber, conductive polymer-coated nanowire or nanofiber, or a combination thereof;
    (b) preparing an electrolyte comprising a non-aqueous solvent and a selenium source dissolved or dispersed in said solvent;
    (c) preparing an anode; and
    (d) bringing said integral layer of mesoporous structure and said anode in ionic contact with said electrolyte and imposing an electric current between said anode and said integral layer of mesoporous structure, serving as a cathode, with a sufficient current density for a sufficient period of time to electrochemically deposit nanoscaled selenium particles or coating directly on said graphene surfaces to form said pre-selenized active cathode layer, wherein said particles or coating have a thickness or diameter smaller than 20 nm.

2. The method of claim 1, wherein said selenium source is selected from $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

3. The method of claim 2, wherein said metal element M is selected from Li, Na, K, Mg, Zn, Cu, Ti, Ni, Co, Fe, or Al.

4. The method of claim 2, wherein $M_xSe_y$ is selected from $Li_2Se_6$, $Li_2Se_7$, $Li_2Se_8$, $Li_2Se_9$, $Li_2Se_{10}$, $Na_2Se_6$, $Na_2Se_7$, $Na_2Se_8$, $Na_2Se_9$, $Na_2Se_{10}$, $K_2Se_6$, $K_2Se_7$, $K_2Se_8$, $K_2Se_9$, $K_2Se_{10}$, or a combination thereof.

5. The method of claim 1, wherein said anode comprises an anode active material selected from an alkali metal, an alkaline metal, a transition metal, a metal from groups 13 to 17 of the periodic table, or a combination thereof.

6. The method of claim 1, further comprising a procedure of depositing an element Z to said porous graphene structure wherein said element Z is mixed with selenium or formed as discrete Z coating or particles having a dimension less than 100 nm and said Z element is selected from Sn, Sb, Bi, S, Te, or a combination thereof and the weight of element Z is less than the weight of selenium.

7. The method of claim 6, wherein said procedure of depositing element Z includes electrochemical deposition, chemical deposition, or solution deposition.

8. The method of claim 1, wherein said nanoscaled selenium particles or coating occupy a weight fraction of at least 70% based on the total weights of said selenium particles or coating and said carbon, graphite, metal or polymer material combined.

9. The method of claim 1, wherein said electrolyte further comprises a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), lithium-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

10. The method of claim 1, wherein said solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

11. The method of claim 1, wherein said anode, said electrolyte, and said integral layer of mesoporous structure are disposed in an external container outside of a lithium-selenium cell and said step of electrochemically depositing nanoscaled selenium particles or coating in said mesoscaled pores is conducted outside said lithium-selenium cell and said method further includes a step of incorporating said pre-selenized active cathode layer in said lithium-selenium cell.

12. The method of claim 1, wherein said anode, said electrolyte, and said integral layer of mesoporous structure are disposed inside a lithium-selenium cell and said step of electrochemically depositing nanoscaled selenium particles or coating in said mesoscaled pores is conducted after said lithium-selenium cell is produced.

13. The method of claim 1, wherein said anode, said electrolyte, and said integral layer of mesoporous structure are part of a lithium-selenium cell and said step of electrochemically depositing nanoscaled selenium particles or coating in said mesoscaled pores occurs after said lithium-selenium cell is fabricated and is conducted during a first charge cycle of said cell.

14. The method of claim 1, wherein said nanoscaled selenium particles or coating occupy a weight fraction of at least 80%.

15. The method of claim 1, wherein said nanoscaled selenium particles or coating occupy a weight fraction of at least 90%.

16. The method of claim 1, wherein said nanoscaled selenium particles or coating have a thickness or diameter smaller than 10 nm.

17. The method of claim 1, wherein said nanoscaled selenium particles or coating have a thickness or diameter smaller than 5 nm.

18. The method of claim 1, wherein said nanoscaled selenium particles or coating have a thickness or diameter smaller than 3 nm.

19. The method of claim 1, wherein said method is conducted in an electrochemical chamber that is outside of an intended alkali metal-selenium cell and said method further contains a step of combining said pre-selenized active cathode layer, an alkali metal anode layer, and an electrolyte to form said alkali metal-selenium cell.

20. The method of claim 1, wherein said method is conducted inside an intended alkali metal-selenium cell and during the first charge or discharge cycle of the cell.

* * * * *